United States Patent [19]
Behney

[11] Patent Number: 5,996,698
[45] Date of Patent: Dec. 7, 1999

[54] FARRIER TOOL WITH RASP AND MEASURE

[76] Inventor: Charles A. Behney, Box 4337, Bisbee, Ariz. 85603

[21] Appl. No.: 08/990,280

[22] Filed: Dec. 15, 1997

[51] Int. Cl.$^6$ .................................................... A01L 11/00
[52] U.S. Cl. .............................................. 168/48.1; 7/164
[58] Field of Search .................. 168/45, 48.1; 407/29.1, 407/29.15; 7/164

[56] References Cited

U.S. PATENT DOCUMENTS

| | | | |
|---|---|---|---|
| 633,523 | 9/1899 | Lytle | 168/48.1 |
| 853,495 | 5/1907 | Brown | 7/164 |
| 1,840,135 | 1/1932 | Schutt | 7/164 |

Primary Examiner—Robert P. Swiatek
Attorney, Agent, or Firm—Antonio R. Durando

[57] ABSTRACT

A substantially rectangular tool has a flat body, approximately 12 inches long and 6 inches wide, with a rasp surface on one side and a file surface on the other. The rasp portion of the tool includes a stop located near one of its narrower ends for abutting against the side wall of the hoof of a horse. This stop is provided as a reference and alignment point to measure the width of the hoof. The file portion on the other side of the tool includes measure markings for determining the width of the hoof being filed with reference to the stop. Both rasp and file portions have cutting edges placed at about 45 degrees with respect to the longitudinal axis of the tool. Two handles, a longer one for pushing the tool and a shorter one for controlling its position through each cutting stroke, are provided at each longitudinal end. In an alternative embodiment of the invention, a filing shoulder perpendicular to the cutting plane of the rasp is provided for trimming the side walls of the hoof.

20 Claims, 2 Drawing Sheets

FARRIER TOOL WITH RASP AND MEASURE

BACKGROUND OF THE INVENTION

1. Field of the Invention

The invention relates generally to farrier rasps and, in particular, to a rasp including means for measuring a hoof width to determine the appropriate size of horse shoe to be used.

2. Description of the Prior Art

Horses need periodic shoeing to protect their hooves and prevent damage to their feet. Typically, the wear and tear on the shoe and the normal growth and expansion of the hoof require filing, trimming and reshoeing every six to eight weeks. Therefore, the process of replacing old shoes and reconditioning hooves is a significant part of the upkeep of a horse and an important aspect of a farrier's work.

In order to replace a horse's shoe, a farrier is required to lift each foot several times to carry out the various steps involved in the process. First the old shoe is extracted; then the hoof is filed down to remove the old, distal horn material and provide a structurally sound anchor for shoe nails; then the width of the hoof is measured for fitting; and finally a new shoe is nailed or otherwise attached to the hoof. Each step involves picking up and holding the foot of the horse between the legs of the farrier such that the hoof faces up and its bottom and side walls are accessible to perform the particular work required. Each step must be carried out for each foot of the horse, which is time consuming and adds to the cost of horse shoeing. Moreover, since rasps in current use are only about two inches wide, it is extremely difficult for farriers to produce a level hoof without "eye-balling" and constantly checking the shoe to make sure there are no gaps between the hoof wall and the shoe that might cause the shoe to rock on the hoof.

A particular problem that results from the procedure just described is the fact that farriers often skip the measuring step for three of the four hooves and use the first measurement for all fittings, assuming that the hooves of all four feet are the same. In fact, though, that is normally not the case and the shoe has to be bent to conform to the particular hoof to which it is being attached. Thus, instead of using a shoe of a different size, as available in commerce for obtaining an optimal fit, this shortcut is often taken to save time and provide a less expensive service. Unfortunately, though, this practice introduces stresses in the hoof that can affect the integrity of its structure and the life of the fit.

Therefore, any improvement in the procedure and tools used in horse shoeing that simplified the process would be welcome by farriers. This invention is directed at providing a tool that makes it possible for a farrier to obtain the advantages of the described shortcut without its negative consequences.

SUMMARY OF THE INVENTION

It is an object of the invention to provide a farrier rasp that includes means for measuring the width of a horse's hoof at the same time the hoof is being filed and shaped for shoeing, thereby avoiding the necessity for the additional step of lifting the foot of the horse to measure it with a different instrument after filing.

Another object of the invention is to provide a rasp tool that is appropriately sized to cover the entire width of a hoof of a variety of horses, thereby facilitating the flat filing of the hoof with single uniform strokes affecting both sides of the hoof without interference with the sole and frog of the foot.

An additional object of the invention is a farrier's tool including rasp and file portions for coarse and fine aspects of horn reduction, as necessary to shape the hoof of a horse for optimal fitting with a shoe.

A further object of the invention is a rasp portion and a file portion with cutting edges arranged at an optimal angle with respect to the structure of the tool so that maximum efficiency is obtained while filing a hoof that is completely covered by the cutting surface, thereby producing a uniform flat surface in a single operation.

According to one embodiment of the invention, the tool includes an additional cutting surface substantially perpendicular to the rasp surface for trimming the side walls of the hoof.

Therefore, according to these and other objectives, the present invention consists of a substantially rectangular tool having a flat body, approximately 12 inches long and 6 inches wide, with a rasp surface on one side and a file surface on the other. The rasp portion of the tool includes a stop located near one of its narrower ends for abutting against a side wall of the hoof of a horse. This stop is provided as a reference and alignment point to measure the width of the hoof. The file portion on the other side of the tool includes measure markings for determining the width of the hoof being filed with reference to the stop. Both rasp and file portions have cutting edges placed at about 45 degrees with respect to the longitudinal axis of the tool. Two handles, a longer one for pushing the tool and a shorter one for controlling its position through each cutting stroke, are provided at each longitudinal end. In an alternative embodiment of the invention, a filing shoulder perpendicular to the cutting plane of the rasp is provided for trimming the side walls of the hoof.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DESCRIPTION OF THE PREFERRED EMBODIMENTS

Figure 1:
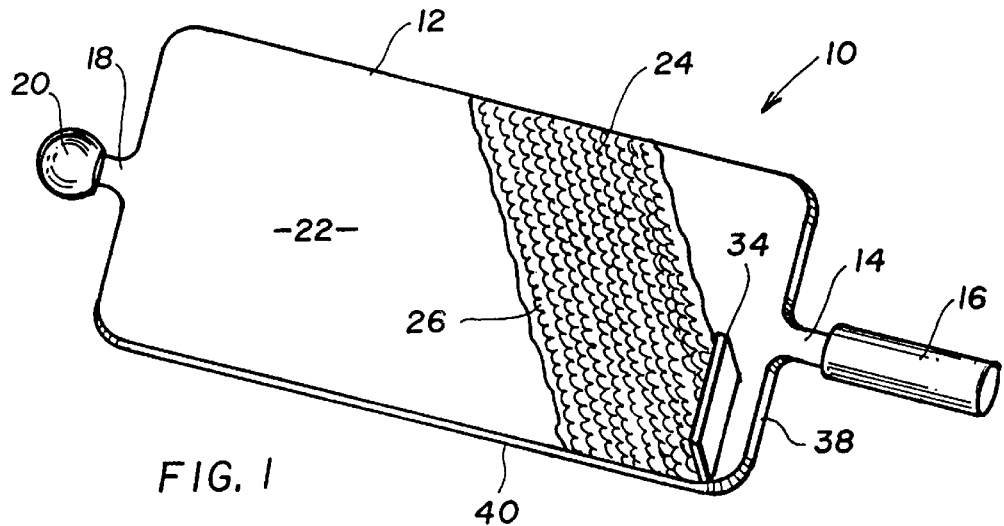
FIG. 1 is a perspective view of one embodiment of a farrier tool in accordance with the invention showing the rasp side of the tool.

Referring to the drawings, wherein like numerals and symbols are used throughout to denote like parts, FIG. 1 is a perspective view of a farrier tool 10 in accordance with the invention. The tool 10 consists of a substantially rectangular, rigid plate 12 with two opposite flat sides suitable for incorporating an abrasive body, such as provided by file or rasp cutting surfaces. As normally defined and understood in the art, a file consists of a cutting surface having ridges or teeth formed by crosscuts at some regular spacing that extend across the face of the surface, typically at an angle with respect to the cutting direction of the surface. A rasp is normally understood to refer to a file structure with individual protruding points or teeth for coarser cutting and trimming. Therefore, the terms file and rasp are used here as understood in the art, without limitation, referring in general to relatively finer and coarser cutting ability, respectively.

Figure 2:
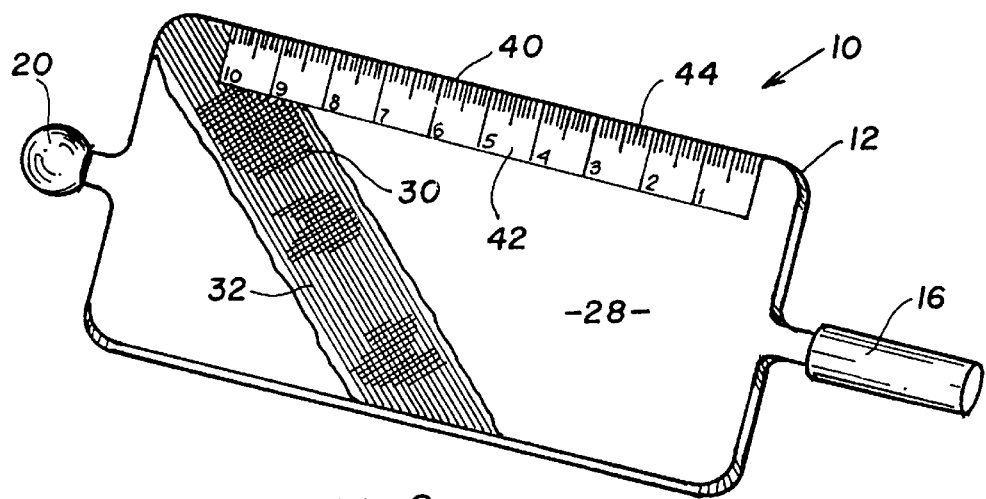
FIG. 2 is a perspective view of the embodiment of a farrier tool of FIG. 1 showing the measure and file side of the tool.

The plate 12 includes a proximal tang 14 for connection with a preferably elongated proximal handle 16; and a distal tang 18 for connection with a preferably rounded distal handle 20. Both handles are preferably disposed along the longitudinal axis of the tool 10. One side 22 of the tool 10 comprises a rasp surface 24 distributed substantially throughout the side 22 of the plate 12 (only a portion of the rasp surface 24 is shown in the drawings for convenience). The teeth of the rasp provide cutting edges 26 disposed facing forward at approximately 45 degrees with respect to the main axis of the tool 10. The other side 28 of the plate 12, illustrated in FIG. 2, comprises a file surface 30 similarly distributed substantially throughout the surface of the side 28 (again, only a portion of the file surface 30 is shown for convenience). The ridges of the rasp provide cutting edges 32 also disposed facing forward at approximately 45 degrees with respect to the main axis of the tool 10.

Figure 3:
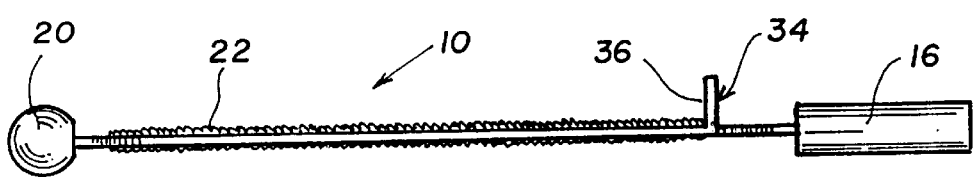
FIG. 3 is a side view of the tool of FIG. 1.
Figure 4:
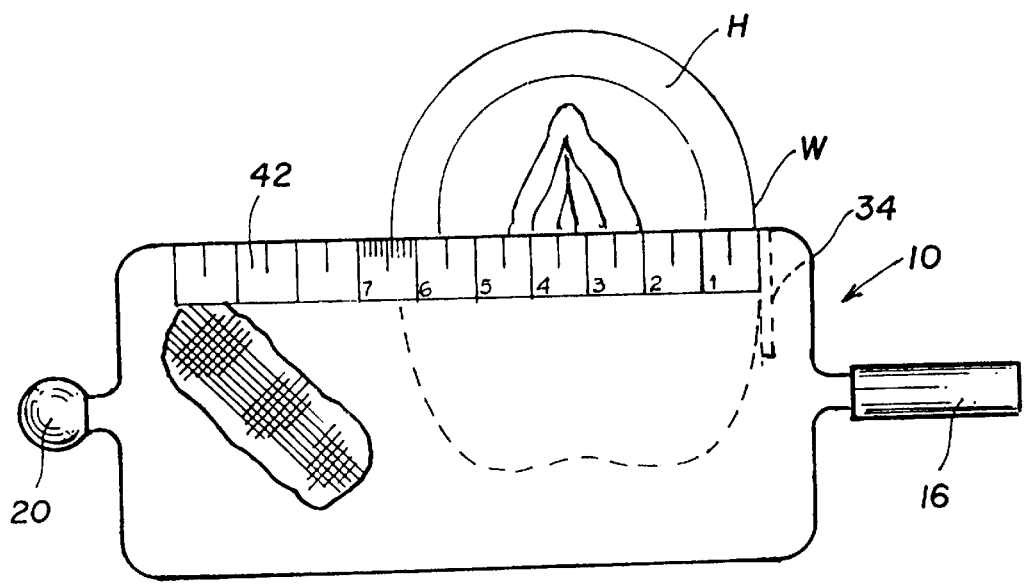
FIG. 4 is a plan view of the tool of FIG. 1 illustrating its use in measuring the width of a hoof butting against the stop of the invention.

As better seen in the side view of FIG. 3, the rasp side 22 of the tool 10 also includes a stop 34 consisting of a rigid structure having a surface 36 substantially perpendicular to the rasp surface 24. The stop 34 is preferably located near the proximal end 38 of the plate 12, positioned approximately in parallel to it, and reaching one of the edges 40 of the plate 12. The file side 28 of the tool 10 includes a linear measure 42 with visible markings 44 corresponding to linear units of measurement. The measure 42 is positioned along the same edge 40 opposite to the stop 34, such that the markings 44 correspond to linear distances from the surface 35 of the stop 34 on the other side of the tool. Thus, the measure 42 can be used to measure the width of a hoof H protruding from the side 40 of the tool 10 and aligned by having a side wall W leaning against the surface 36 of the stop 34, as illustrated in FIG. 4 (wherein the hidden portion of the hoof H is shown in phantom line). As seen in the figure, for example, assuming that the markings in the measure 42 correspond to inches, the hoof H would be found to measure approximately 6.5 inches.

The preferred size of the plate 12 is about 12 inches long and about 6 inches wide, a size found to be sufficient to cover entirely the hoof of any horse. This complete coverage is important to ensure uniform abrasion over the entire surface of the hoof at each stroke during filing, which is very desirable in preparation of the hoof for shoeing. By having the cutting edges 26 and 32 of the rasp and file surfaces at a 45-degree angle with respect to the longitudinal axis of the tool (measured clockwise, as described), a hoof can be efficiently filed by pushing the tool 10 forward from right to left at about that same angle with respect to the front of the user. This is the normal stroke used by a right-handed person during a filing operation, where the right hand is used to push the proximal handle 16 and the left hand to control the tool through the distal handle 20. Therefore, when the tool of the invention is intended for a left-handed user, the cutting edges 26 and 32 of the rasp and file surfaces should be positioned at a 45-degree angle measured counterclockwise from the longitudinal axis of the tool, so that the same advantage can be obtained by pushing the tool forward from left to right.

In order to use the tool, the hoof of a horse is lifted and rapped between the legs of a farrier facing away from the leg of the horse, as usual. The hoof is first coarsely filed down using the rasp surface 24, and then finely filed to a uniform flat configuration using the file surface 30. After the hoof is shaped as desired, the combination of the stop 34 and measure 42 is used to measure the precise width of the hoof being shod. Then the appropriate shoe is nailed or otherwise attached to the hoof. The process is repeated for each hoof, thereby ensuring that each is fitted with the correct size of shoe.

Figure 5:
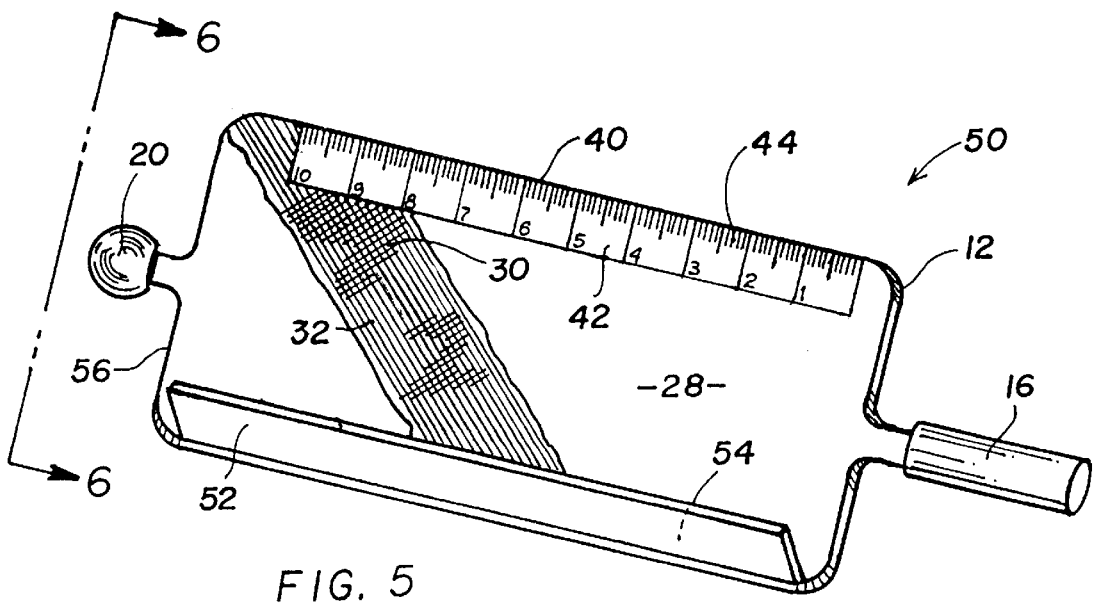
FIG. 5 is a perspective view of another embodiment of a farrier tool in accordance with the invention showing the file side of the tool.
Figure 6:
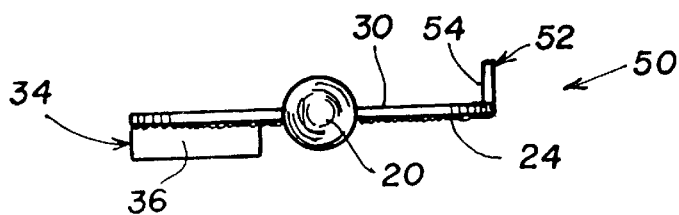
FIG. 6 is a view of the tool of FIG. 5 as seen from line 6—6 in that figure.

In another embodiment 50 of the invention shown in FIG. 5, the tool is also equipped with a vertical shoulder 52 having an abrasive inside surface 54 for filing the side walls W of the hoof. The shoulder 52 is preferably placed on the file side 28 of the tool 50, such that it can be used to trim the walls during the finer filing operation. The shoulder 52 is advantageously placed on the edge of the side 28 providing the most beneficial use to a user. Since most users would tend to carry out the trimming of the hoof wall with their dominant hand, the shoulder 52 is preferably placed such that in use it is on the side of that hand with respect to the proximal handle 16. FIG. 6 illustrates the tool 50 designed primarily for a right-hand user as seen from its distal end 56.

The preferred material for manufacturing the tool of the invention is steel or an alloy of the type normally used to make files, rasps and other tools with an abrasive surface. Various modifications can be made by one skilled in the art within the meaning and range of equivalence of the appended claims. For example, the placement of the various functional components 24, 30, 34, 42 and 52 can be varied, so long as the working relationship between them is maintained. Similarly, the invention is described for use by a farrier for shoeing a horse, but it can be advantageously used with any hoofed mammal in equivalent fashion.

Various other changes in the details, steps and materials that have been described may be made by those skilled in the art within the principles and scope of the invention herein illustrated and defined in the appended claims. Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. A farrier tool comprising:

a rigid plate having opposite first and second substantially flat sides;

a rasp surface integrally formed within the first flat side;

a linear measure incorporated into the second flat side; and means for aligning an object, such as a hoof of a horse, with said linear measure such that a dimension of the object can be determined from the measure;

wherein said means for aligning an object includes a planar surface substantially perpendicular to the rasp surface.

2. A farrier tool comprising:

a rigid plate having opposite first and second substantially flat sides;

a rasp surface incorporated into the first flat side;

a file surface incorporated into the second flat side;

a linear measure incorporated into the second flat side; and means for aligning an object, such as a hoof of a horse, with said linear measure such that a dimension of the object can be determined from the measure.

3. The tool of claim 2, wherein said rasp surface has rasp cutting edges placed at about 45 degrees with respect to a longitudinal axis of the tool.

4. The tool of claim 3, wherein said means for aligning an object with said linear measure consists of a stop in said first flat side.

5. The tool of claim 2, further comprising a proximal handle and a distal handle substantially disposed along a longitudinal axis of the tool.

6. The tool of claim 5, wherein said means for aligning an object with said linear measure consists of a stop in said first flat side.

7. The tool of claim 2, wherein said means for aligning an object with said linear measure consists of a stop in said first flat side.

8. The tool of claim 2, wherein said rasp surface has rasp cutting edges placed at about 45 degrees with respect to a longitudinal axis of the tool, and said file surface has file cutting edges placed at about 45 degrees with respect to said longitudinal axis.

9. The tool of claim 8, wherein said means for aligning an object with said linear measure consists of a stop in said first flat side.

10. The tool of claim 9, further comprising a proximal handle and a distal handle disposed along a longitudinal axis of the tool.

11. The tool of claim 2, wherein said means for aligning an object with said linear measure consists of a stop in said first flat side.

12. The tool of claim 2, further comprising abrasive means for trimming a side wall of a hoof.

13. The tool of claim 12, wherein said abrasive means consists of a shoulder structure having an abrasive surface substantially perpendicular to the rigid plate of the tool.

14. The tool of claim 12, wherein said rasp surface has rasp cutting edges placed at about 45 degrees with respect to a longitudinal axis of the tool.

15. The tool of claim 12, further comprising a proximal handle and a distal handle disposed along a longitudinal axis of the tool.

16. The tool of claim 12, wherein said means for aligning an object with said linear measure consists of a stop in said first flat side.

17. The tool of claim 12, further comprising a file surface incorporated into the second flat side.

18. The tool of claim 17, wherein said rasp surface has rasp cutting edges placed at about 45 degrees with respect to a longitudinal axis of the tool, and said file surface has file cutting edges placed at about 45 degrees with respect to said longitudinal axis.

19. The tool of claim 18, wherein said means for aligning an object with said linear measure consists of a stop in said first flat side.

20. The tool of claim 19, wherein said flat plate is approximately 12 inches long and approximately 6 inches wide.

* * * * *